(12) United States Patent
Mikkelsen et al.

(10) Patent No.: US 6,269,190 B1
(45) Date of Patent: *Jul. 31, 2001

(54) COMPUTER SYSTEM FOR PROCESSING IMAGES USING A VIRTUAL FRAME BUFFER

(75) Inventors: Carl Mikkelsen, Sudbury; Michael Speciner, Acton, both of MA (US)

(73) Assignee: Electronics for Imaging, Inc., Foster City, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/719,256

(22) Filed: Sep. 24, 1996

(51) Int. Cl.⁷ .......................................... G06K 9/36
(52) U.S. Cl. ............................. 382/232; 382/305
(58) Field of Search ............................... 382/232, 244, 382/246, 247, 305, 319; 358/426, 261.1, 261.2, 429; 395/114, 115, 116, 117; 345/517, 147, 126

(56) References Cited

U.S. PATENT DOCUMENTS

| | | | |
|---|---|---|---|
| 3,921,135 | 11/1975 | Komaru et al. | 340/146.3 |
| 4,028,731 | 6/1977 | Arps et al. | 358/260 |
| 4,409,621 | 10/1983 | Richards et al. | 358/260 |
| 4,467,363 | 8/1984 | Tench, Jr. | 358/261 |
| 4,580,162 | 4/1986 | Mori | 358/135 |
| 4,725,815 | 2/1988 | Mitchell et al. | 340/347 |
| 4,791,680 | 12/1988 | Yokoe et al. | 382/56 |
| 4,868,653 | 9/1989 | Golin et al. | 358/133 |
| 4,875,174 | 10/1989 | Olodort et al. | 364/519 |
| 4,949,188 | 8/1990 | Sato | 358/448 |
| 4,965,751 | 10/1990 | Thayer et al. | 364/521 |
| 5,034,804 | 7/1991 | Sasaki et al. | 358/41 |

(List continued on next page.)

FOREIGN PATENT DOCUMENTS

| | | | |
|---|---|---|---|
| 38 16627 A1 | 11/1989 | (DE) | H04N/1/21 |
| 0 119 720 A2 | 9/1984 | (EP) | G06F/15/20 |
| 0 146 714 A2 | 7/1985 | (EP) | G06F/15/20 |
| 0 320 014 A2 | 6/1989 | (EP) | G06F/15/72 |
| 0 378 316 A1 | 7/1990 | (EP) | H04N/1/41 |
| 0 411 232 A2 | 2/1991 | (EP) | H04N/1/411 |
| 0 475 601 A3 | 3/1992 | (EP) | G06F/15/72 |
| 0 585 074 A2 | 3/1994 | (EP) | G06F/15/72 |
| 0 597 571 A2 | 5/1994 | (EP) | G06F/15/72 |
| 0 613 102 A1 | 8/1994 | (EP) | G06K/15/00 |
| 0 764 918 A2 | 3/1997 | (EP) | G06K/15/00 |

OTHER PUBLICATIONS

Written Opinion International application No.: PCT/US97/16793 Filed Sep. 7, 1998.

*Primary Examiner*—Jose L. Couso
*Assistant Examiner*—Anh Hong Do
(74) *Attorney, Agent, or Firm*—Michael A. Glenn

(57) ABSTRACT

A page of an image is divided into several regions. Each of these regions may be compressed according to a different technique according to the kind of data within the region. Compression is used to reduce the memory requirements. Data for each region is available at any time and can be randomly accessed. Display operations may be processed in any order. For each display operation, the region which is affected is uncompressed and processed. As other regions are processed, memory space is made available by compressing data in currently unused regions. By using this kind of representation of a page and method of processing display operations, each region can be represented independently and differently. Because display operations can be processed in any order, regions may be processed by multiple imaging systems functioning in parallel. Additionally, representations of regions on a page can be stored, transmitted, or used in different locations at different times.

46 Claims, 8 Drawing Sheets

U.S. PATENT DOCUMENTS

| | | | |
|---|---|---|---|
| 5,050,100 | 9/1991 | Damon et al. | 364/514 |
| 5,056,044 | 10/1991 | Frederickson et al. | 364/521 |
| 5,068,805 | 11/1991 | Tsuzuki | 395/164 |
| 5,079,630 | 1/1992 | Golin et al. | 358/133 |
| 5,087,979 | 2/1992 | Schaertel | 358/296 |
| 5,095,520 | 3/1992 | Kim | 395/101 |
| 5,122,873 | 6/1992 | Golin | 358/133 |
| 5,129,049 | 7/1992 | Cuzzo et al. | 395/113 |
| 5,146,544 | 9/1992 | Altham et al. | 395/115 |
| 5,146,548 | 9/1992 | Bijnagte | 395/117 |
| 5,150,454 | 9/1992 | Wood et al. | 395/114 |
| 5,151,949 | 9/1992 | Miyata | 382/9 |
| 5,185,599 | 2/1993 | Doornink et al. | 347/747 |
| 5,199,803 | 4/1993 | Shimizu et al. | 400/121 |
| 5,204,738 | 4/1993 | Aragaki | 358/75 |
| 5,206,735 | 4/1993 | Gauronski et al. | 358/296 |
| 5,207,517 | 5/1993 | Ito | 400/121 |
| 5,208,676 | 5/1993 | Inui | 358/296 |
| 5,210,623 | 5/1993 | Weldy | 358/458 |
| 5,231,695 | 7/1993 | Harrington | 395/134 |
| 5,241,397 | 8/1993 | Yamada | 358/296 |
| 5,263,136 | 11/1993 | DeAguiar et al. | 395/164 |
| 5,270,728 | 12/1993 | Lund et al. | 346/1.1 |
| 5,272,768 | 12/1993 | Bauman et al. | 395/110 |
| 5,276,780 | 1/1994 | Sugiura | 395/116 |
| 5,295,233 | 3/1994 | Ota | 395/115 |
| 5,297,217 | 3/1994 | Hamilton, Jr. et al. | 382/41 |
| 5,299,292 | 3/1994 | Kadowaki et al. | 395/108 |
| 5,299,310 | 3/1994 | Motoyama | 395/165 |
| 5,303,334 | 4/1994 | Snyder et al. | 395/109 |
| 5,315,693 | 5/1994 | Hirosawa | 395/128 |
| 5,315,696 | 5/1994 | Case et al. | 395/133 |
| 5,315,698 | 5/1994 | Case et al. | 395/162 |
| 5,321,810 | 6/1994 | Case et al. | 395/166 |
| 5,337,258 | 8/1994 | Dennis | 364/551.01 |
| 5,341,472 | 8/1994 | Leak | 395/166 |
| 5,347,368 | 9/1994 | Mochizuki | 358/296 |
| 5,349,647 | 9/1994 | Freiburg et al. | 395/115 |
| 5,354,135 | 10/1994 | Sakagami et al. | 400/124 |
| 5,355,441 | 10/1994 | Kawai et al. | 395/115 |
| 5,363,107 | 11/1994 | Gertz et al. | 342/26 |
| 5,369,533 | 11/1994 | Ottesen et al. | 360/51 |
| 5,374,943 | 12/1994 | Lehmann et al. | 347/9 |
| 5,374,957 | 12/1994 | Sharma | 348/391 |
| 5,377,312 | 12/1994 | Kobauasio | 395/116 |
| 5,384,912 | 1/1995 | Ogrinc et al. | 395/164 |
| 5,387,783 | 2/1995 | Mihm et al. | 235/375 |
| 5,413,321 | 5/1995 | Banks et al. | 270/58 |
| 5,428,423 | 6/1995 | Clark | 355/77 |
| 5,438,653 | 8/1995 | Boenke et al. | 395/131 |
| 5,445,367 | 8/1995 | Long | 270/1.1 |
| 5,457,549 | 10/1995 | Kumada et al. | 358/530 |
| 5,459,818 | 10/1995 | Grant et al. | 395/114 |
| 5,465,304 | 11/1995 | Cullen et al. | 382/176 |
| 5,471,563 | 11/1995 | Dennis et al. | 395/114 |
| 5,479,587 | 12/1995 | Campbell et al. | 395/116 |
| 5,483,622 | 1/1996 | Zimmerman et al. | 395/114 |
| 5,493,105 | 2/1996 | Desai | 235/375 |
| 5,497,498 | 3/1996 | Taylor | 395/800 |
| 5,500,924 | 3/1996 | deSilva et al. | 395/129 |
| 5,500,928 | 3/1996 | Cook et al. | 395/133 |
| 5,502,636 | 3/1996 | Clarke | 364/401 |
| 5,504,842 | 4/1996 | Gentile | 395/114 |
| 5,504,843 | 4/1996 | Catapano et al. | 395/115 |
| 5,506,944 | 4/1996 | Gentile | 395/114 |
| 5,506,985 | 4/1996 | Motoyama et al. | 395/600 |
| 5,509,115 | 4/1996 | Butterfield et al. | 395/147 |
| 5,511,156 | 4/1996 | Nagasaka | 395/133 |
| 5,532,838 | 7/1996 | Barbari | 358/400 |
| 5,539,865 | 7/1996 | Gentile | 395/115 |
| 5,544,290 | 8/1996 | Gentile | 395/115 |
| 5,552,898 | 9/1996 | Deschuytere | 358/426 |
| 5,594,860 | 1/1997 | Gauthier | 395/501 |
| 5,600,768 | 2/1997 | Andresen | 395/135 |
| 5,602,976 | 2/1997 | Cooper et al. | 395/116 |
| 5,615,314 | 3/1997 | Schoenzeit et al. | 395/114 |
| 5,625,712 | 4/1997 | Schoenzeit et al. | 382/245 |
| 5,638,498 | 6/1997 | Tyler et al. | 395/117 |

COMPUTER SYSTEM FOR PROCESSING IMAGES USING A VIRTUAL FRAME BUFFER

FIELD OF THE INVENTION

The present invention is related to processes and apparatus for processing image data, including combinations of text, graphics, and other images. More particularly, the present invention is related to techniques for reducing buffer memory requirements for such processes and apparatus.

BACKGROUND OF THE INVENTION

Most computer systems use a form of raster image to output image data to a visual output device such as a cathode ray tube (CRT) monitor, liquid crystal display (LCD), or a printer such as a color laser copier. A raster image is represented as a series of scan lines of pixels, wherein each pixel is accessed in a sequential manner, and each scan line is processed. An area to which image data may be output sequentially by the visual output device is referred to as a page. The image data of a page provides its complete visual representation.

Interpreters of page description languages typically process images in one or both of two modes: band mode and frame mode. In band mode, the entire page description is read, and a list of every imaging operation, called a display list, is built including all the data needed to image the page. Since all of the data also may include very large scanned images, a display list can grow to be very large. Scanned images require that the display list be temporality stored on secondary storage, with a performance reducing step required both to read and write. A fundamental advantage, however, is that the output frame is only traversed once, which permits lower speed devices to be connected with a minimum of buffering.

Frame mode on the other hand, does not include constructing a display list. Instead, a full image exists, and as each imaging operation is encountered, it is immediately processed to update the fill page image. Scanned images are also processed immediately, eliminating the problem of temporarily storing them. Thus, whereas band mode traverses the output page image in an orderly fashion, sweeping from one edge to the opposite edge, frame mode accesses the output page randomly.

Both of these however generally require a buffer memory which can hold the entire visual representation of a page. This memory is referred to as a frame buffer. Because of the large memory requirements for representation of a page, particularly with color laser copiers and color images, it is desirable to reduce the buffer memory requirements, for example by using some form of compression.

One compression method is shown in U.S. Pat. No. 5,506,944 to Ronald S. Gentile. This reference shows a system in which an image is divided into several regions. A page description, describing objects to be placed on the page, is ordered so that commands for each region are processed together. The regions are processed sequentially. A single memory element capable of storing the image data of an entire region in an uncompressed form is provided. After each region is processed, its corresponding image data is stored in a stack (a last-in, first-out buffer) in compressed format. When a page has been completely processed, this compressed image data is then read out of the stack to be decompressed and output to a printer.

A problem with this system however is that it requires a page description to be completely processed or ordered before processing of the frames can begin. It does not display operations to be processed in an arbitrary order. Additionally, it may suffer from the same problems as band mode operation when the display list becomes too large.

SUMMARY OF THE INVENTION

In the present invention, a page of an image is divided into several regions. Each of these regions may be compressed according to a different technique according to the kind of data within the region. In the proffered embodiment, the regions are fixed in equal sizes in an N×M matrix, but they need not be for purposes of the invention. Data for each region is available at any time and can be randomly accessed. Display operations may be processed in any order. For each display operation, the region which is affected, is uncompressed and processed. As other regions are processed, memory space is made available by compressing data in currently unused regions.

By using this kind of representation of a page and method of processing display operations, each region can be represented independently and differently. Each region can be compressed with a method that works well for the data contained in that region. Compression is used to reduce the memory requirements. Because display operations can be processed in any order, regions may be processed by multiple imaging systems functioning in parallel. Additionally, representations of regions on a page can be stored, transmitted, or used in different locations at different times.

Accordingly, one aspect of the present invention is a computer system and computer-implemented process for generating a representation of a document image. A representation of a document is generated, wherein the representation includes an indication of a plurality of regions into which the document is divided, compressed image data for each region and an index indicating a storage location of the compressed image data for each region. Indications of operations for generating the document image are received. For each operation, the representation of the document image is processed so as to add image data to the representation. Such processing involves identifying each region affected by addition of image data according to the indicated operation, decompressing the compressed image data of the identified region, and modifying the decompressed image data according to the indicated operation.

Another aspect of the invention is a digital nonvolatile computer-readable data recording medium for storing a representation of a page of a document comprised of a plurality of regions. The representation defines a list of region descriptions on the nonvolatile computer-readable data recording medium, wherein each region description includes an indication of a compression mode used to generate the compressed image data of the region, and an address indicating a storage location of the compressed data. For each region, compressed image data is defined at the storage location on the nonvolatile computer-readable data recording medium.

BRIEF DESCRIPTION OF THE DRAWING

For a better understanding of the present invention, reference is made to the accompanying drawings, where are incorporated herein by reference and in which.

DETAILED DESCRIPTION

The present invention will be more completely understood through the following detailed description which should be read in conjunction with the attached drawing in which similar reference numbers indicate similar structures.

Figure 1:
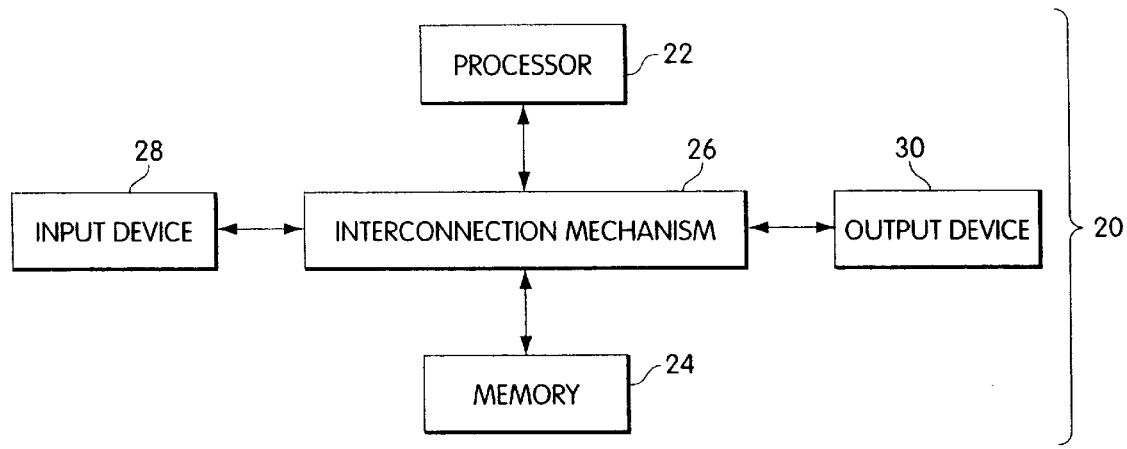
FIG. 1 is a block diagram of an example computer system which may be used for implementing the present invention.

The present invention may be implemented using a digital computer. A typical computer system 20 is shown in FIG. 1, and includes a processor 22 connected to a memory system 24 via an interconnection mechanism 26. The interconnection mechanism is typically a combination of one or more buses and one or more switches. An input device 28 is also connected to the processor and memory system via the interconnection mechanism, as is an output device 30.

It should be understood that one or more output devices may be connected to the computer system. Example output devices include a cathode ray tube (CRT) display, liquid crystal display (LCD), printers including color laser copiers, communication devices, such as a modem, and audio output. It should also be understood that one or more input devices 28 may be connected to the computer system. Example input devices include a keyboard, keypad, trackball, mouse, pen and tablet, communication device, audio input and image scanner. It should be understood that the invention is not limited to the particular input or output devices used in combination with the computer system or to those described herein. The input and output devices may be included within or external to a main unit which typically houses the processor 22, memory system 24 and interconnection mechanism 26.

The computer system 20 may be a general purpose computer system, which is programmable using a high level computer programming language, such as "C++." The computer system may also be implemented using specially programmed, special purpose hardware. In a general purpose computer system, the processor is typically a commercially available processor, such as the Pentium microprocessor from Intel Corporation. Many other processors are also available. Such a processor executes a program called an operating system, such as the Windows operating system from Microsoft Corporation, which controls the execution of other computer programs and provides scheduling, debugging, input-output control, accounting compilation, storage assignment, data management, memory management, and communication control and related services. The processor and operating system define a computer platform for which application programs in high level programming languages are written. It should be understood that the invention is not limited to a particular computer platform, particular operating system, particular processor, or particular high level programming language. Additionally, the computer system 20 may be a multi-processor computer system or may include multiple computers connected over a computer network.

Figure 2:
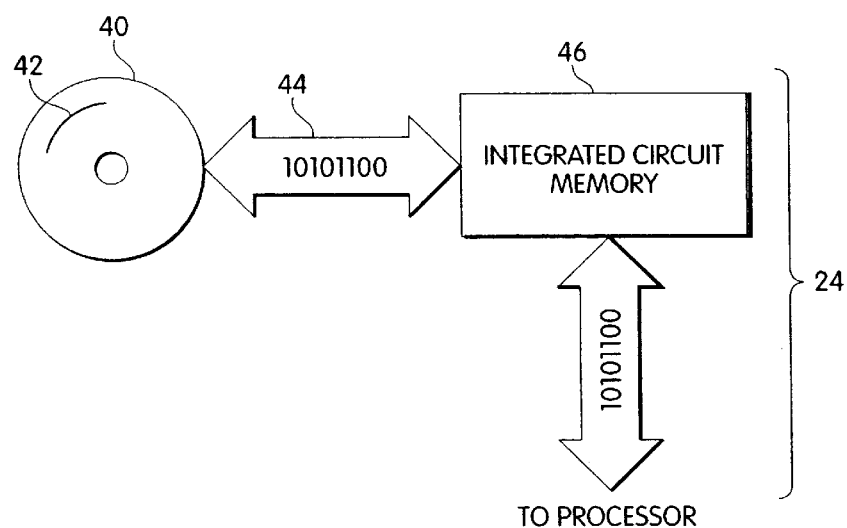
FIG. 2 is a block diagram illustrating a typical memory system for use in the computer system in FIG. 1.

An example memory system 24 will now be described in more detail in connection with FIG. 2. A memory system typically includes a computer readable and writable non-volatile recording medium 40, of which a magnetic disk, a flash memory, and tape are examples. The disk may be removable, known as a floppy disk, and/or permanent, known as a hard drive. The disk, which is shown in FIG. 2, has a number of tracks, as indicated at 42, in which signals are stored, in binary form, i.e., a form interpreted as a sequence of 1's and 0's, as shown at 44. Such signals may define an application program to be executed by the microprocessor, or information stored on the disk to be processed by the application program, such as video information stored in a data file. Typically, in operation, the processor 22 causes data to be read from the non-volatile recording medium 40 into an integrated circuit memory element 46, which is typically a volatile random access memory, such as a dynamic random access memory (DRAM) or static memory (SRAM). The integrated circuit memory element 46 allows for faster access to the information by the processor and disk 40, and is typically called the system memory. The processor generally causes the data to be manipulated within the integrated circuit memory 46 and copies the data to the disk 40 if modified, when processing is completed. A variety of mechanisms are known for managing data movement between the disk 40 and the integrated circuit memory 46, and the invention is not limited thereto. It should also be understood that the invention is not limited to a particular memory system.

Figure 3:
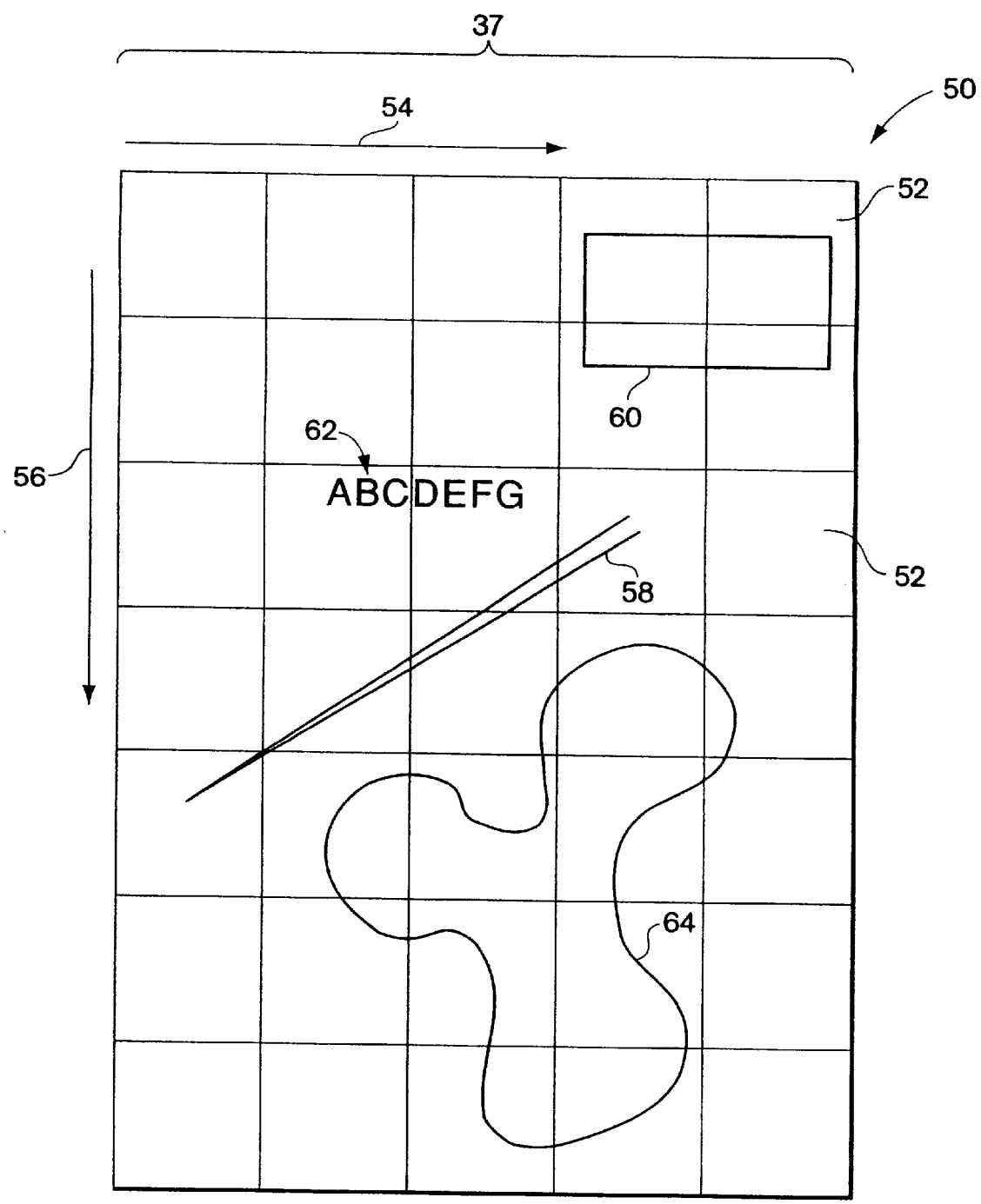
FIG. 3 is a diagram illustrating a page of image data divided into several regions.

The present invention provides a system for representing images such as shown in FIG. 3. FIG. 3 shows a page of image data from a raster image. Each page 50 is broken into an array of regions 52. There are a plurality of regions horizontally as indicated at 54 and vertically as indicated at 56. In one embodiment of the invention, each region is 128×128 pixels. For a typical sheet of 8½×11 paper, using a typical resolution for a color laser copier, there are roughly 37 regions horizontally, each of which is 128 pixels wide. Each region may contain one or more image objects which may include lines 58, detailed images 60, text 62 or other objects 64. The image objects and their location on the page are typically represented using a page description language such as PostScript (a trademark of Adobe Systems, Inc.).

Figure 4:
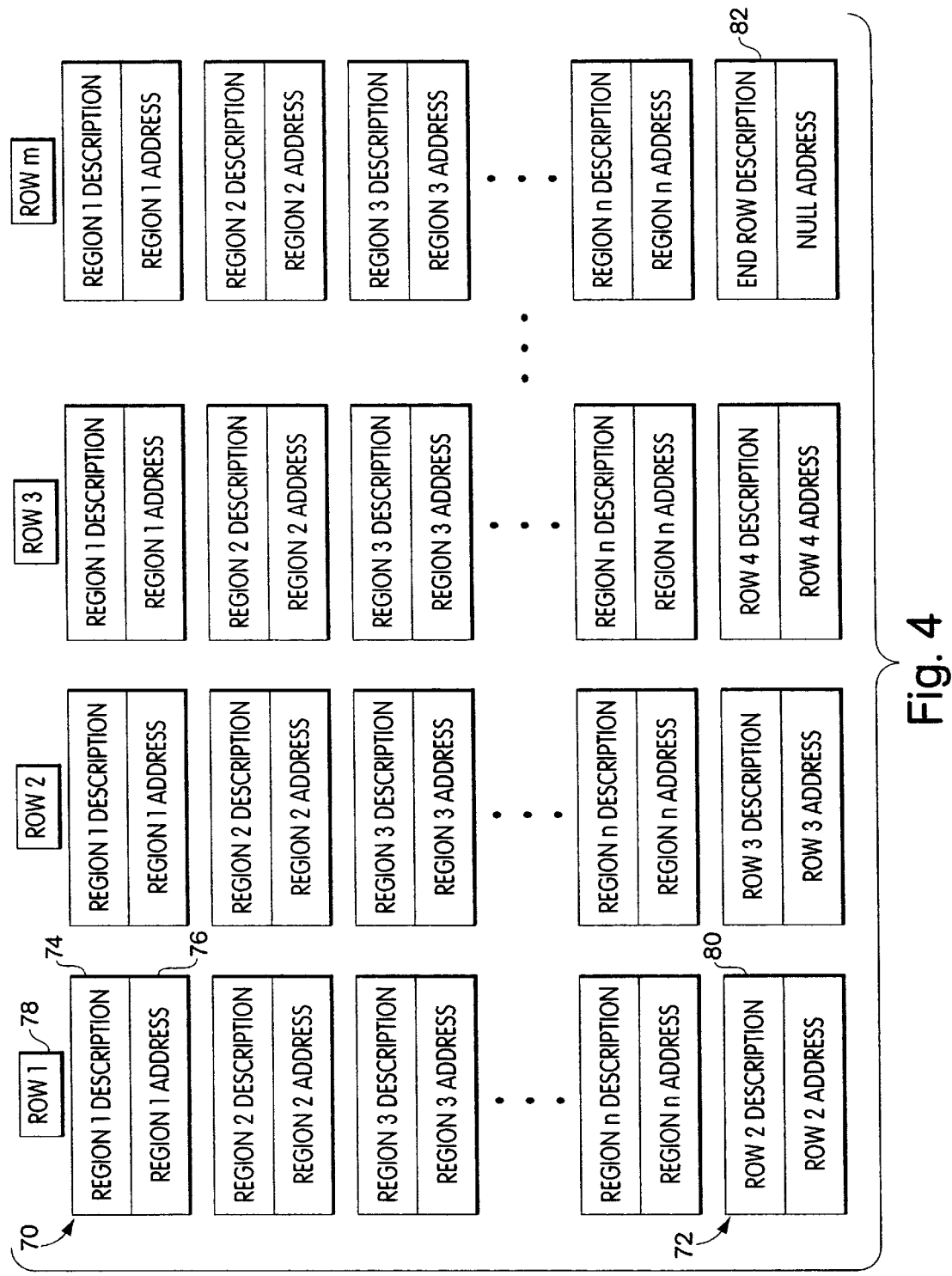
FIG. 4 is a diagram illustrating a data structure for representing a virtual frame buffer divided into several regions.

In the present invention, each region of the page is separately addressed and is independent of the neighboring regions. Accordingly, each region can be represented independently and differently. FIG. 4 shows a representation of the image in one embodiment of the invention. In this embodiment of the invention, a page of data is represented by an N×M matrix, where N is the number of regions in each row in the image, and M is the number of rows of regions in the page. The representation shown in FIG. 4 can be implemented as a linked list of region descriptors 70 and row descriptors 72. In particular, each region descriptor 70 includes a description 74 indicating a kind of compression or encoding used for this region, and an address 76 indicating the location of the actual image data (which may be encoded, compressed, or uncompressed) in computer memory. Each row 78 includes a list of region descriptors 70, followed by a row descriptor 72. In a row descriptor 72, the description 80 includes a link to the next row, e.g., row 2, and an indication of whether this is the last row, such as shown at 82.

By using such a representation of an image, each region may be compressed with a compression method that is different from the compression method of other regions. Thus, each region can be compressed with a method that works well for the data contained in that region. Additionally, some regions can be compressed, while other regions can be maintained uncompressed. Similarly, some regions can be compressed with methods that introduce loss while other regions can be compressed using a technique that is not lossy.

Figure 5:
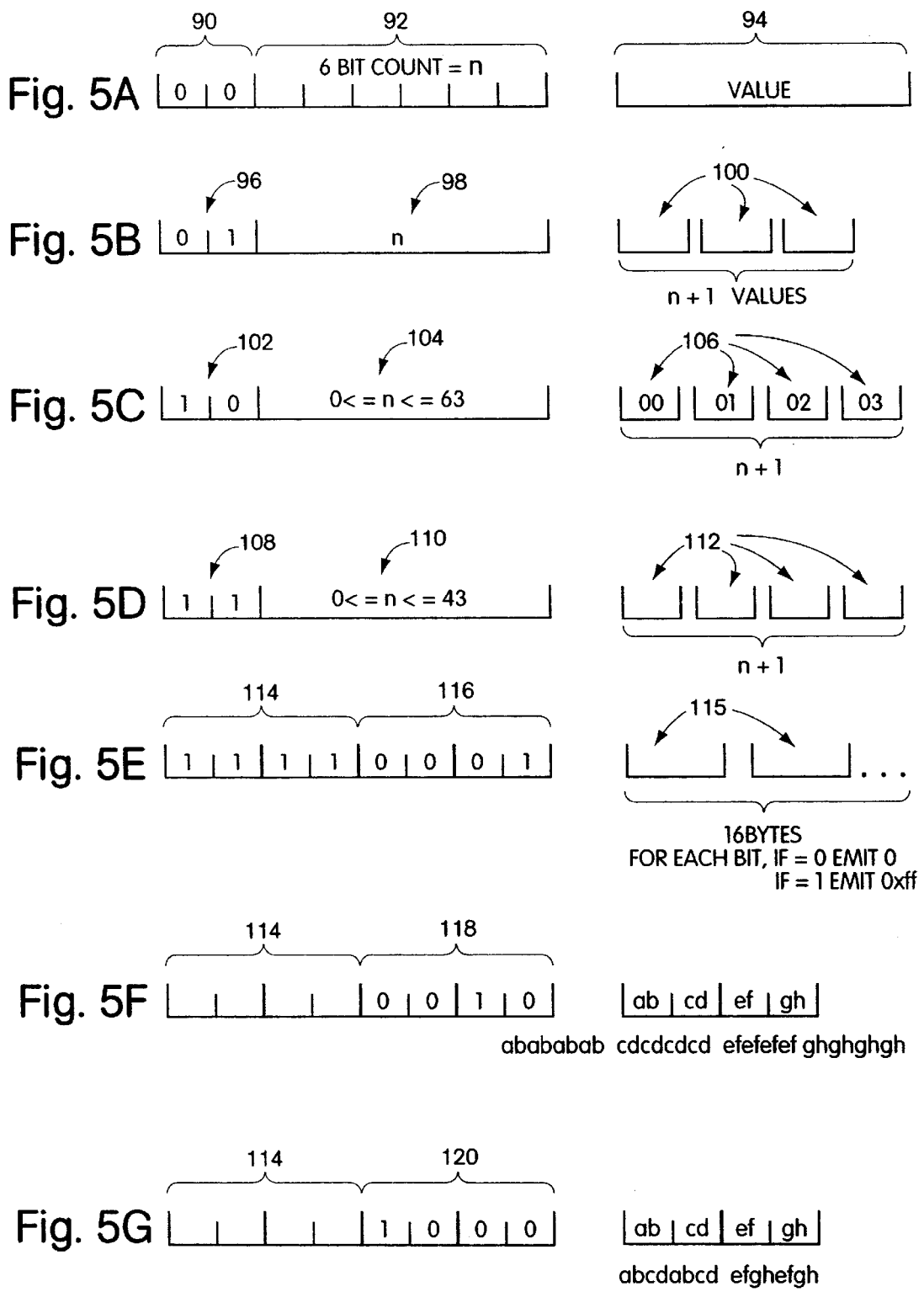
FIGS. 5a–5g are diagrams illustrating example formats for representing run coded data.

Some suitable compression formats will now be described in connection with FIGS. 5a–5g. All of these methods use a form of run length encoding. Referring now to FIG. 5a, each data word of coded data includes a two bit identifier 90, indicating the type of compression and a count 92, followed by a value 94. In FIG. 5a, the indicated code identifies a format in which N+1 pixels of the value indicated by field 94 are emitted upon decoding. The value N is defined by the 6 bit value in the field 92.

Some compression is provided by the formats shown in FIGS. 5b–5d. In FIG. 5b, the compression code 96 is followed by a value N as indicated at 98, then followed by N+1 values 100. This format indicates that the N+1 values following the instruction word 96, 98 are to be emitted upon decoding. Similarly, in FIG. 5c, the compression code 102 indicates that a number N of values follow, as indicated at 104. This compression code is somewhat lossy because each of these values is to be emitted twice upon decoding. In particular, if the first value is "00," it is emitted twice, i.e., to produce "0000" before the next value is then emitted twice. Similarly, as shown in FIG. 5d, the compression code 108 indicates that a number N as indicated at 110 of values 112 are to be emitted sequentially in triplicate upon decoding.

Bit mode compression formats are also provided as shown in FIGS. 5e–5g. A 1 bit mode compression format is shown in FIG. 5e. A bit mode is indicated by the first 4 bits of the instruction code as indicated at 114. The last 4 bits of the instruction code as indicated at 116 indicates a 1 bit mode compression format in FIG. 5e. In this format, for each of the 16 bytes that follow the instruction code, a byte representing 0X00 is emitted for each 0 bit and a byte representing 0XFF is emitted for each 1 bit. Similarly, in 2 bit mode as shown in FIG. 5f, which is indicated by an instruction code as indicated at 118, every 2 bits indicates a particular byte value to be output. In 4 bit mode, as indicated at 120 in the instruction code of FIG. 5g, every 4 bits is used to determine an output byte. There are many other compressions methods which may be used in the present invention, of which some are discussed in more detail below. For example, in FIG. 4, by using a unique code as a region address 76, a simple way for representing the region as being entirely white or entirely black is obtained. This can represent the fact that no image data exists for that region.

Figure 6:
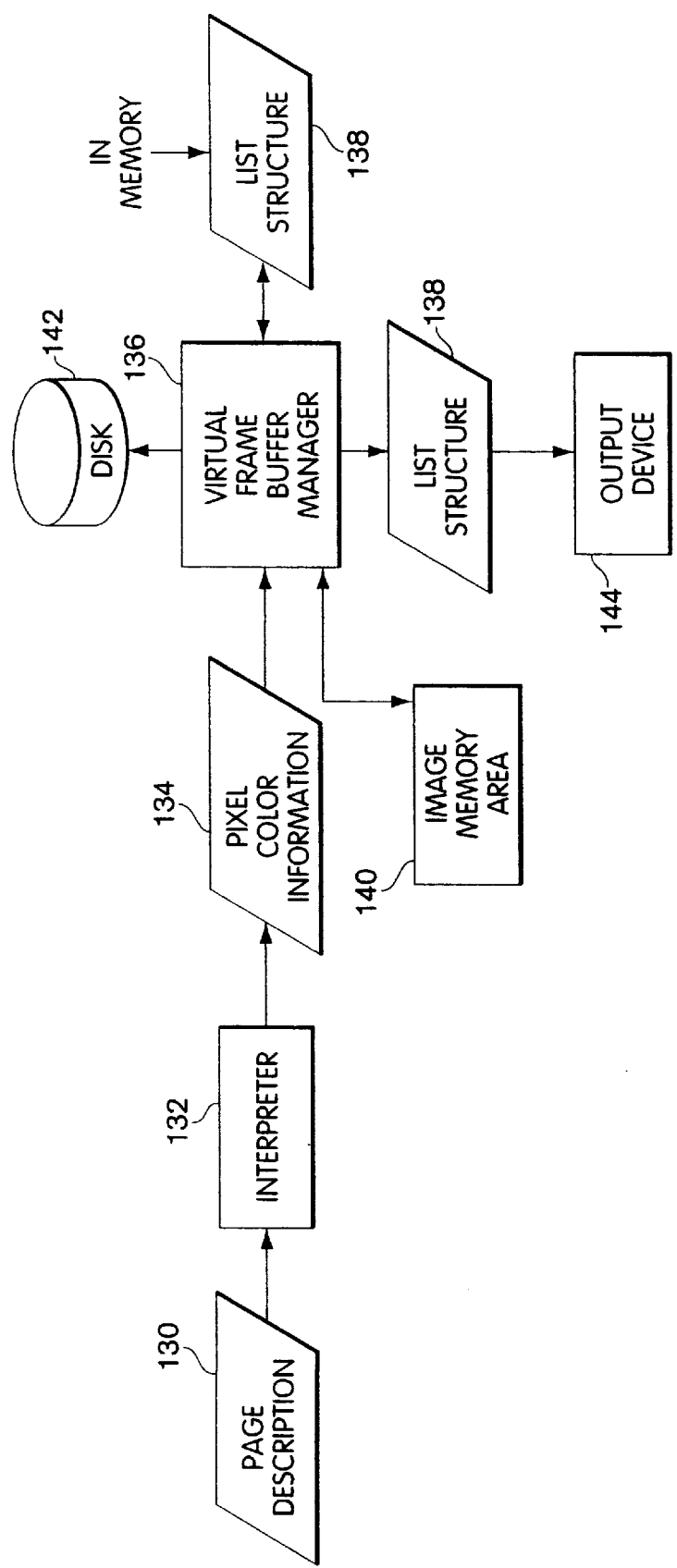
FIG. 6 is a data flow diagram of one embodiment of the present invention.

The processing of a page description to produce a representation such as shown in FIG. 4, will now be described in connection with FIGS. 6 and 7. A page description 130 is typically provided in a page description language such as PostScript. An interpreter 132 receives the page description 130 and processes it according to the definition of the page description language. For example, the PostScript language can be used which is well-known in the art. There are commercially-available interpreters for this language and it is possible to build an interpreter given the language definition. The interpreter 132 outputs, for each command in the page description language, image information such as color for each pixel affected by the operation, as indicated at 134.

This information 134 indicates a location in a page and the image information, e.g., color, to which it should be set. This information is utilized by a virtual frame buffer manager 136 to modify and maintain a list structure 138 such as described above in connection with FIG. 4. In particular, the virtual frame buffer manager 136 maintains an image memory area to which the addresses 76 (FIG. 4) refer for each region. This image memory area is illustrated at 140 in FIG. 6 and is typically located in the memory system 24 in the computer system 20. The virtual frame buffer manager 140 writes pixel and color information into appropriate locations in the image memory area and compresses and decompresses data for regions in that area in accordance with space available in the image memory area. Preferably, the image memory area is smaller than a frame buffer that would be required to hold uncompressed data for the entire page. Using the virtual frame buffer manager 136, regions that are not being used by the imaging system at any particular time can be maintained compressed, while regions that are being used can be uncompressed for efficiency and ease of access. There is no requirement that the storage kind or size used to store the regions to be uniform. Thus, memory or disk could be used, as well as other storage means.

A flow chart of the operation of the virtual frame buffer manager 136 will now be described in more detail in connection with FIG. 7. The pixel data is received in step 150. The virtual frame buffer manager 136 then determines what region contains this pixel in step 152. This is done by using a mapping between the number of pixels per line and lines per region, to the number of regions per row and number of rows per page. Next, the virtual frame buffer manager determines whether the region data is compressed and also determines the location of the data in step 154. This is done by examining the list structure 138. Next, conditional decompression takes place. Thus, if the region data is compressed, it is accessed and decompressed in step 156 and placed into the image memory area 150. The list structure 138 is updated to the new location and to indicate that the data is now uncompressed. If sufficient free memory space is not available in the image memory area 150, an uncompressed region is located and is then compressed to make space available. Selection of an uncompressed region may be performed by examining the list structure 138 such as shown in FIG. 4, and the list structure is updated when the data is compressed with the new compression type and its new location. The location of the region data is then located in step 158 once uncompressed data is available. This uncompressed data is then updated in step 160 according to the received pixel data. The next pixel data can then be received by returning to step 150.

Figure 7:
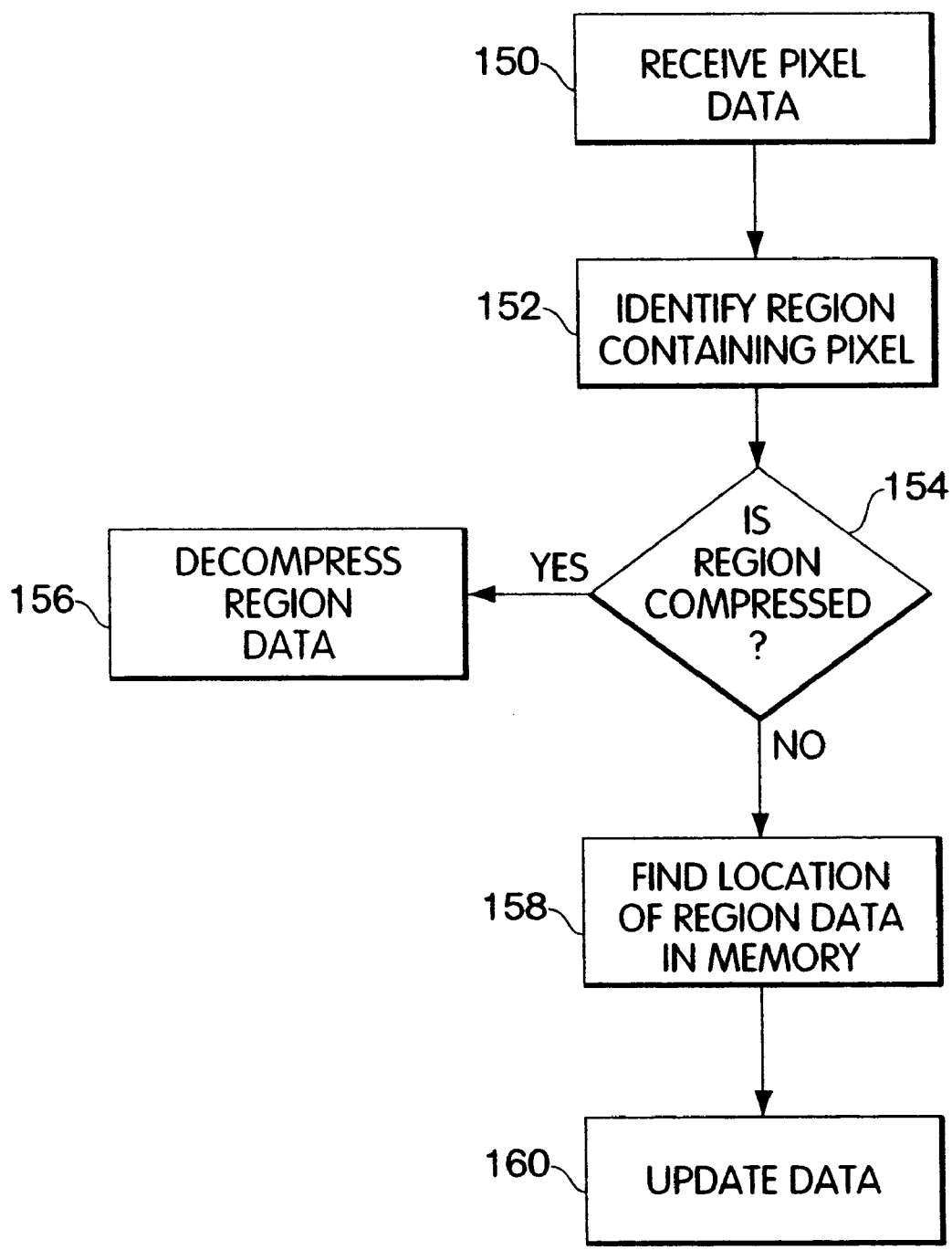
FIG. 7 is a flowchart describing operation of the virtual frame buffer manager 136 in FIG. 6.

In the process described in FIG. 7, compressed data for all image regions are stored in the image memory area 140. However, there is no requirement for the storage used for the regions to be uniform. For example, some regions may be held in random access memory, others on a disk, and others on a network accessible server. Compressed representations of a page can be stored on secondary storage, transmitted through a network, or in other ways moved in space or time to be printed in a different location or to be processed at a later time. In particular, the list structure 138 and compressed and uncompressed region data may be combined and stored on a disk, such as indicated at 142, for later use. In such a case, the linked list of representation such as shown in FIG. 4, can be a simple array stored at the beginning of a file, wherein the region address 76 indicates the offset of the data within the data file. Such data representations can then be stored for later use or transmitted in a network for example. In particular, a representation of a region may be stored and later copied into a data file. A list structure 138 may also be initialized by reading such a data file. The list structure 138 may also be output to an output device 144. One embodiment of an output device will now be described in connection with FIGS. 8 and 9.

The representation of a page as provided by such a list structure 138, an embodiment of which is shown in FIG. 4, permits a circuit receiving such a list structure to construct a stream of output pixels in real-time. That is, the regions descriptions can be processed as if they are computer instructions to which the hardware is responsive to generate the image data.

More particularly, the image to be decompressed and output is represented in the main memory of the computer as a list of rows and regions. Each row of regions contains as many region descriptions as there are regions across the page, as well as the memory location of the next row. Each region description includes the memory location of data for the region and the form of compression used for that region. Each region description can then be used as an instruction to the output device that indicates the location of the data and the operation to be performed on the data.

Figure 8:
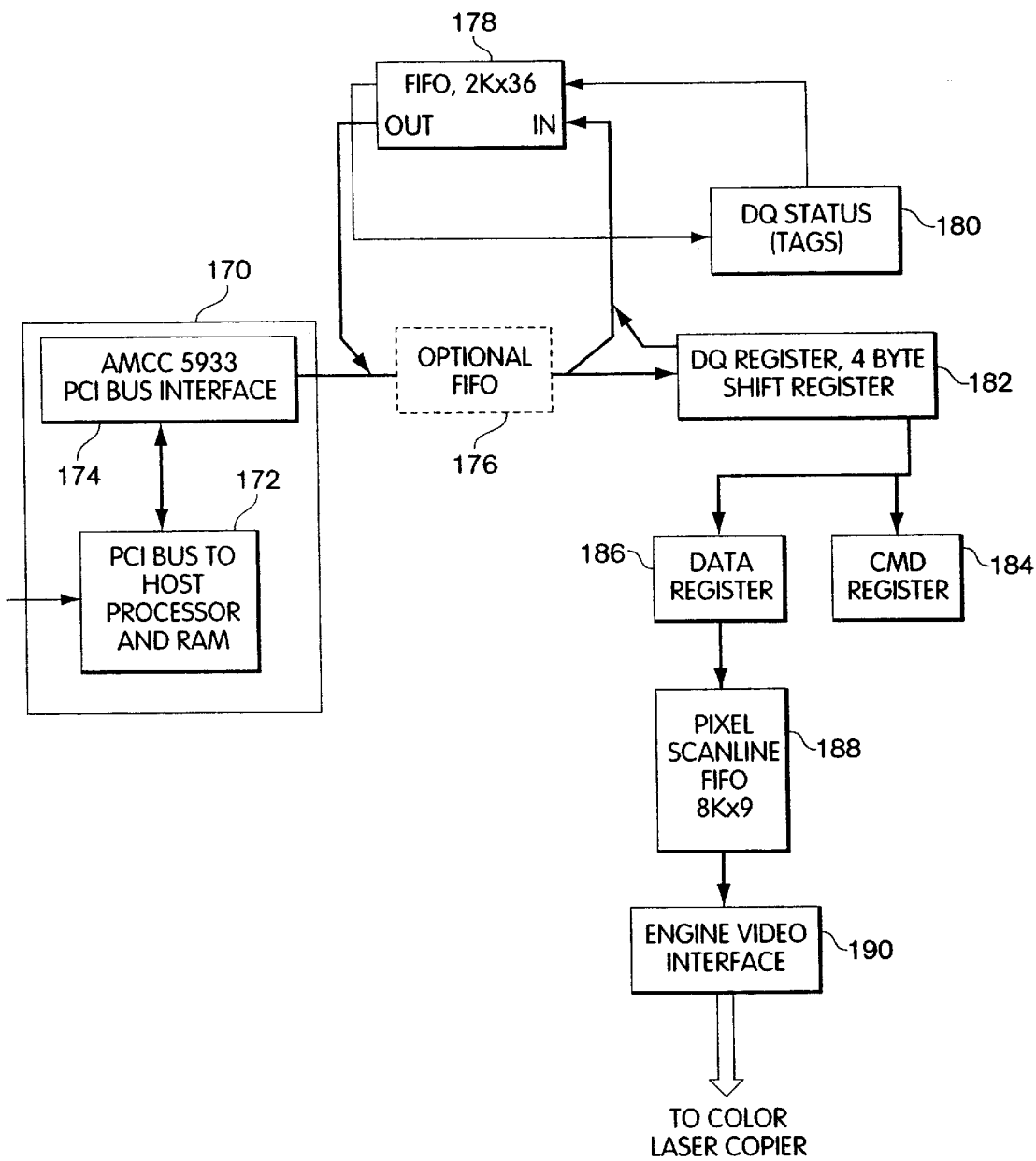
FIG. 8 is a more detailed block diagram of one embodiment of the output device 144 in FIG. 6.

One embodiment of the output device 144 which provides scan line data to visual output, such as a color laser copier, is shown in FIG. 8. This circuit includes an interface 170 which connects the output device to the interconnection mechanism 26 of the computer system 20. For example, if the interconnection mechanism is a PCI bus, as indicated at 172, a PCI bus interface 174 may be used, such as the AMCC 5933 PCI bus interface. Data is read from the list structure 138 through the PCI interface 170 to the remainder of the circuit. An optional FIFO 176 may be used to decouple operation of the circuit synchronization with data transfer over the PCI bus interface 170. The data is read into the FIFO 178 which temporarily stores data from the list structure and image data to be processed. A status register 180 processes tags assigned to the data as the data is placed into the FIFO 178 in a manner to be described below. A register 182 is used to read the data from the FIFO 178 and decipher commands and data to be placed into a register 184 and 186. The data in the data register is processed according to the command in the command register 184 and output to the pixel scan line FIFO as shown at 188. This FIFO is accessed by an engine video interface 190 which reads data at rates determined by a visual output device, such as a color laser copier.

The operation of this circuit will now be described in more detail in connection with FIG. 9. The FIFO 178 is used as a variable capacity buffer. Each word in the FIFO 178 contains 32 bits of data, plus a tag indicating what type of data it is. The types of data include a region type or description, 4 bytes of buffer data, 3 bytes of buffer data, 2 bytes of buffer data, 1 byte of buffer data, or a region address. The FIFO is loaded initially with a list of two word descriptions of each region in the row about to be processed, as indicated at 200 in FIG. 9. The first word of each description is tagged as a region type, and indicates how the region is compressed. The second word of each description is tagged as the region address, and indicates where the data for the region can be found. The data is then read from the FIFO by the register 182. A variety of actions are taken depending on what type of data is found. Region addresses are fed to the memory channel to read sequences of words of region data. Enough data is read from a region for one scan line in step 202. Region data is consumed by processing of the descriptions components and is either stored in the FIFO or not after processing, depending on the decompression mode.

In particular, the data for a region for one scan line is placed in the FIFO 178 after the region type and region address are placed back into the FIFO first. Because the buffer 178 is a FIFO, each region description in a row will be accessed first, placed back in the FIFO followed by enough data for one scan line for that region. The data placed in the FIFO 178 is tagged as a type of buffer data. When the row description at the end of the list of region descriptions is read from the FIFO 178, the region descriptions are then processed with the data that follows. Each pixel is then generated according to the type of region in step 204. If there is any unused data when the end of the region in the scan line is achieved, the remaining data is placed back into the end of the FIFO and the next region is selected in step 206. In particular, in some compression modes pixel data is then generated according to the type of the next region as indicated at 204. When the end of the line is reached, enough data for each region for the next scan line is then read in step 202. The steps 204 through 206 repeat until the last scan line of this row of regions is reached as indicated at 208. When the last line of the row is processed, the list structure for the next row of regions is then read in step 200 and the process repeats for steps 200 through 208 for the next row. The last row of a page is detected by the end of row description 82 followed by a NULL address as shown in FIG. 4.

Figure 9:
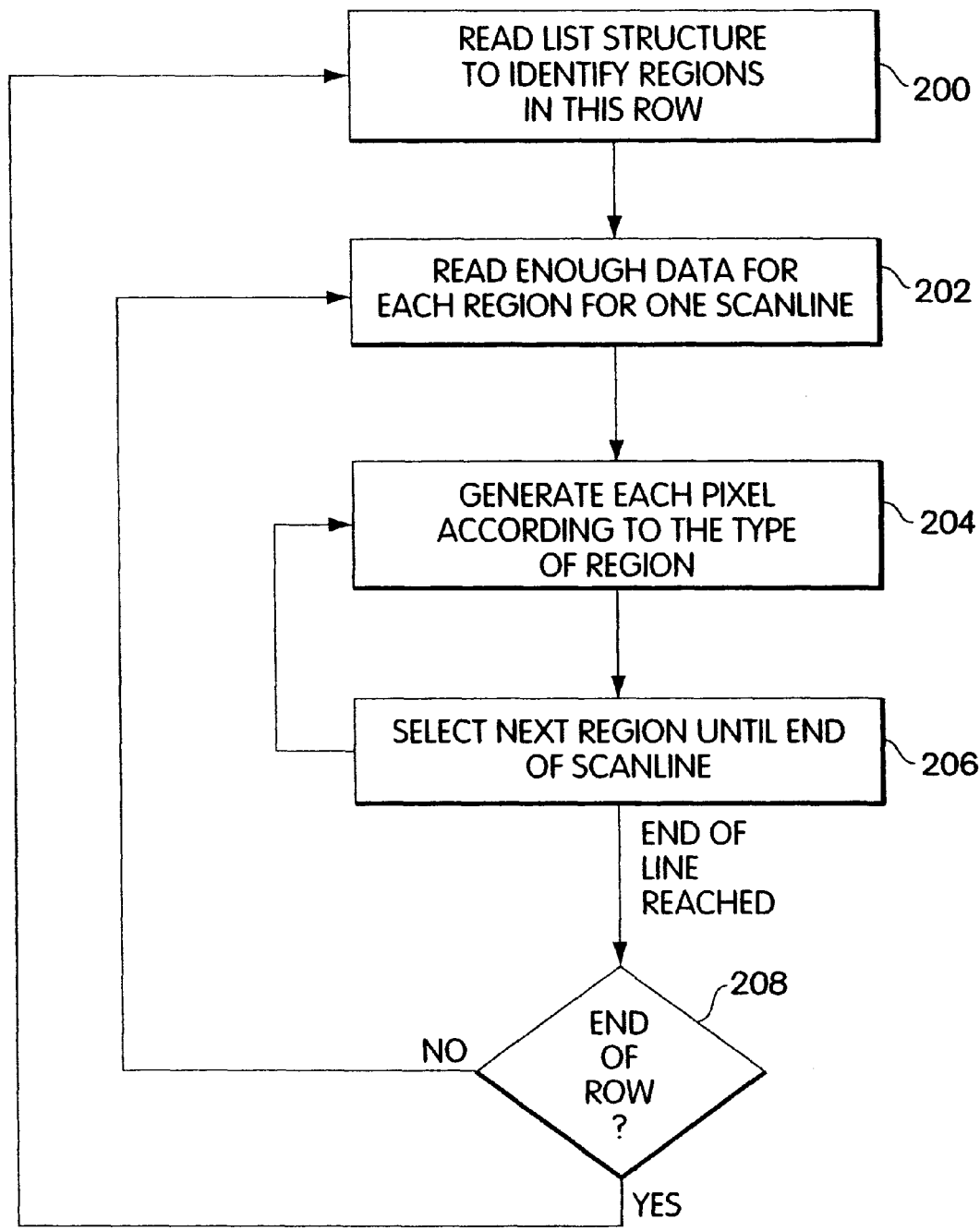
FIG. 9 is a flowchart describing operation of the circuit described by FIG. 8.

Using the circuits and process described in FIGS. 8 and 9 to process a list structure as shown in FIG. 4 provides a simple and cost effective way to buffer data representing the region descriptions as well as the actual data for the regions during the generation of output image data.

Dynamically changing the representations between compressed and uncompressed formats is similar to a virtual memory system. Some of the traditional problems associated with virtual memory are expected. For example, if a page description requires imaging into every region repeatedly, a significant amount of time will be required to manage the representations.

To solve these problems of virtual memory in one embodiment of the invention the imaging system begins operation in a band mode. As each imaging operation is encountered, it is added to a display list by the interpreter 132. Under certain conditions, the display list is processed, just as if the imaging system were operating in band mode. For system efficiency, scanned images are processed as if the imaging system is operating in a frame mode, eliminating the need to temporarily store the image data. One condition is the occurrence of a scanned image in the page description. In such a case, the display list is processed immediately in band mode, and the imaging system converts to frame mode. After completing the scanned image, imaging again returns to band mode.

Another condition occurs when a sufficient number of imaging operations have been recorded. In such a case, the display list is executed to limit the amount of memory required for the display list, and to be able to print very shortly after a request for display is encountered, and to allow the display list to reside completely in physical memory without being swapped to virtual memory. When completely processed, the display list is discarded, and a new display list is started.

An incidental benefit of this embodiment relates to clipping, or using constructs in to the page description language limit the portion of the page that will be colored by any imaging operation. In frame mode, the description of the clipped region must be processed for each imaging operation. In band mode, the description is processed only once, and each imaging operation, in turn, is clipped against each scan line. The band mode method is more efficient, and is preserved in this embodiment.

Other embodiments of the invention may use other kinds of image compression. When creating the image of a page, lossy compression should be avoided as much as possible. Because the amount of available memory is typically less than that required to store a full, uncompressed page, some lossy compression ultimately may be required. The amount of loss, though, generally depends on the context of the whole page, not an individual region.

Pages usually consist of a mixture of graphic elements, such as text, line drawings, white space, and scanned images. These different elements compress best with different techniques, and yield different compression results. If every region is assumed to be maximally complex, then highly lossy techniques would be required for the entire page, which is inappropriate. To allow for the degree of loss to be adaptive both to the available memory, and to the complexity of the whole page, an adjustable compression target is preferably used in one embodiment of the invention. Target compression levels may be set according to how dense the image is in a region, or could be based on the amount of contrast or color in a region. The compression target is the minimum acceptable compression ratio for each region when compressed. When beginning processing of a page, compression targets are set very low, allowing any region to be compressed with loss-less techniques. In such an embodiment, as the page is processed, the amount of RAM available may become insufficient, even with most of the page compressed. When this occurs, the compression targets are raised, and regions which are not compressed at least as well as the new target are recompressed with lossy techniques, to force them to meet the new target, until sufficient memory is recovered. RAM recovered by re-compressing regions is reused to image other regions of the page. If, again, all the RAM is consumed, the compression targets are raised higher, and the re-compression process is repeated.

Compression techniques can be used to take advantage of the fact that the human visual system is not equally sensitive to all colors. For example, the eye is particularly sensitive to black, and particularly insensitive to yellow. Thus, when compression targets need to be raised, lossy compression techniques can used on yellow areas first, and black areas last. This adaptive compression techniques described above can be extended to use a different compression target for each color plate, e.g., cyan, magenta, yellow and black, depending on the kind of image data that is being used. The regions in which there is more yellow in the plate that contains the yellow spectrum of colors are determined by examining the color plates that make up a region. When compression targets for a region are increased, the compression target that is raised for the more-yellow plate areas first, forces the yellow areas to be compressed with lossy techniques (and thus lose detail) before the black or other plates are similarly compromised. The compression target for cyan is raised next, followed by the compression target for magenta, and so on. The compression target for black is increased last.

The human visual system is also more sensitive to high contrast details than to low contrast details. Accordingly, it is more important to avoid lossy compression in regions with high contrast details than in regions with low contrast details. Each region may be scored according to an amount of important detail it contains. When compression targets are raised, they are raised first in regions having less important detail. Since the present invention does not have prior knowledge of the contents of the image before the compression is performed, once one compression method is utilized, if the compression level does not meet the target compression level, another compression method can be applied instead.

The present invention also helps reduce the amount of time used for mechanical overhead of a color laser copier when printing. This overhead involves positioning each sheet of paper, loading it onto the transfer drum, generating the image with typically four colors, fusing the document and depositing the completed document in the output tray. To improve throughput, these overhead times should be reduced, eliminated, or amortized over a large number of pages.

For example, a large image memory is sometimes used to hold a substantial number of pages. Using adaptive compression and achieving high compression ratios, there is often enough image memory to store many full page images. By storing more data for printing, the image of a printer may be started and operated continuously, i.e., to the maximum number of pages the printer will accept in a print command. Without the compression, vastly larger quantities of expensive RAM would be required to buffer enough distinct images. Because the printer is processing several images, it is possible to process more images in parallel. By monitoring the image memory of the printer, if the memory is likely to become empty before the next image has been processed, the continuous print operation can be canceled.

Another technique which may be used to optimize printer engine performance is to print black and white pages using color print cycles. Without this optimization, a document that is alternate color and black-only pages would incur the engine overhead on every page, typically running about one and a half sheets per minute. Although this typically raises the prints cost slightly, the speed improvement can be dramatic. Because the page description can indicate what kind of page is upcoming the present invention allows such an optimization to be applied.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims and equivalent thereto.

What is claimed is:

1. A computer implemented process for creating a computer readable representation of an image comprising:
   creating a data structure for storing an indication of forms and memory locations of image data associated with regions of the image, where the image is defined as a plurality of said regions defined by a first number, M, indicating the number of rows of regions in the image and a second number, N, indicating the number of regions in each row of the image, such that M and N are both greater than one and each region comprises a plurality of line segments from a plurality of lines;
   allocating memory to store image data associated with all of the regions; and
   rendering display lists including image operations by performing, for each image operation, steps of:
   identifying a region affected by the image operation;
   modifying image data associated with the identified region;

storing image data associated with each region in a form and at memory locations located within the allocated memory according to an amount of memory required to store the image data associated with all of the regions and an amount of memory allocated to store the image data associated with all of the regions; and updating the data structure.

2. The process of claim 1, wherein the display list comprises a subset of the image operations that represent the image and wherein the subset of image operations is processed sequentially for each display list.

3. The process of claim 1, wherein the memory location of image data associated with a region is determined independently of the memory location of image data associated with other regions.

4. The process of claim 1, wherein the image data is stored independently for each of the regions in compressed or uncompressed form.

5. The process of claim 4, wherein the memory location of image data associated with a region is determined independently of the compressed or uncompressed form of the image data associated with the region.

6. The process of claim 1, wherein the rendering of display lists further comprises decompressing the image data associated with the identified region if the image data is compressed and recovering memory when the amount of memory required to store the image data associated with all of the regions exceeds the amount of memory allocated to store the image data associated with all of the regions.

7. The process of claim 6, wherein the recovering of memory comprises compressing uncompressed image data.

8. The process of claim 6, wherein the recovering of memory comprises decompressing and recompressing image data that has been compressed.

9. The process of claim 1, wherein the rendering of display lists further comprises recovering memory when the modifying causes the amount of memory required to store the image data associated with all of the regions to exceed the amount of memory allocated to store the image data associated with all of the regions.

10. The process of claim 9, wherein the recovering of memory comprises compressing uncompressed image data.

11. The process of claim 9, wherein the recovering of memory comprises decompressing and recompressing image data that has been compressed.

12. The process of claim 1, further comprising steps of:

reading stored image data for enough regions to provide enough image data for at least one scan line;

generating pixels from the read stored image data of a first region;

selecting a next region from regions read;

repeating the steps of generating and selecting until an end of a scanline is reached; and determining if a current region is a location in a next row, and returning to the step of reading when the current region is a location in the next row, and returning to the step of generating pixels when the current region is not a location in the next row.

13. The process of claim 1 wherein the step of rendering the display list comprises steps of:

accumulating into a display list, a sequence of at least one command in the page description;

terminating the step of accumulating according to a predetermined decision procedure;

processing the commands in the display list to produce and update an image in a frame buffer;

clearing the display list; and repeating the steps of accumulating, terminating, processing, and clearing until the page description has been completely processed.

14. A computer system for creating a computer readable representation of an image comprising:

means for creating a data structure for storing an indication of forms and memory locations of image data associated with regions of the image, where the image is defined as a plurality of said regions defined by a first number, M, indicating the number of rows of regions in the image and a second number, N, indicating the number of regions in each row of the image, such that M and N are both greater than one and each region comprises a plurality of line segments from a plurality of lines;

means for allocating memory to store image data associated with all of the regions; and means for rendering display lists including image operations, wherein the means for rendering comprises:

means for identifying a region affected by the image operation;

means for modifying image data associated with the identified region;

means for storing image data associated with each region in a form and at memory locations located within the allocated memory according to an amount of memory required to store the image data associated with all of the regions and an amount of memory allocated to store the image data associated with all of the regions; and means for updating the data structure.

15. The computer system of claim 14, wherein the display list comprises a subset of the image operations that represent the image and wherein the subset of image operations is processed sequentially in scan line order for each display list.

16. The computer system of claim 14, wherein the memory location of image data associated with a region is determined independently of the memory location of image data associated with other regions.

17. The computer system of claim 14, wherein the image data is stored independently for each of the regions in compressed or uncompressed form.

18. The computer system of claim 17, wherein the memory location of image data associated with a region is determined independently of the compressed or uncompressed form of the image data associated with the region.

19. The computer system of claim 14, wherein the means for rendering further comprises means for decompressing the image data associated with the identified region if the image data is compressed and means for recovering memory when the amount of memory required to store the image data associated with all of the regions exceeds the amount of memory allocated to store the image data associated with all of the regions.

20. The computer system of claim 19, wherein the recovering of memory comprises compressing uncompressed image data.

21. The computer system of claim 19, wherein the recovering of memory comprises decompressing and recompressing image data that has been compressed.

22. The computer system of claim 14, wherein the means for rendering further comprises means for recovering memory when the means for modifying causes the amount of memory required to store the image data associated with all of the regions to exceed the amount of memory allocated to store the image data associated with all of the regions.

23. The computer system of claim 22, wherein the recovering of memory comprises compressing uncompressed image data.

24. The computer system of claim 22, wherein the recovering of memory comprises decompressing and recompressing image data that has been compressed.

25. A computer implemented process for creating a computer readable representation of an image comprising:

creating a data structure for storing an indication of forms and memory locations of image data associated with regions of the image, where the image is defined as a plurality of said regions defined by a first number, M, indicating the number of rows of regions in the image and a second number, N, indicating the number of regions in each row of the image, such that M and N are both greater than one and each region comprises a plurality of line segments from a plurality of lines;

allocating memory to store image data associated with all of the regions;

rendering display lists including image operations; and storing image data independently for each of the associated regions in compressed or uncompressed form within the allocated memory, wherein the memory locations for the image data are determined independently of the compressed or uncompressed form of the image data.

26. The process of claim 25, wherein the display list comprises a subset of the image operations that represent the image and wherein the subset of image operations is processed sequentially in scan line order for each display list.

27. The process of claim 25, wherein the memory location of image data associated with a region is determined independently of the memory location of image data associated with other regions.

28. The process of claim 25, wherein the step of rendering display lists includes, for each image operation, steps of:

identifying a region affected by the image operation;

modifying image data associated with the identified region;

storing image data associated with each region in a form and at memory locations located within the allocated memory according to an amount of memory required to store the image data associated with all of the regions and an amount of memory allocated to store the image data associated with all of the regions;

updating the data structure;

decompressing the image data associated with the identified region if the image data is compressed; and recovering memory when the amount of memory required to store the image data associated with all of the regions exceeds the amount of memory allocated to store the image data associated with all of the regions.

29. The process of claim 28, wherein the recovering of memory comprises compressing uncompressed image data.

30. The process of claim 28, wherein the recovering of memory comprises decompressing and recompressing image data that has been compressed.

31. The process of claim 25, wherein the step of rendering display lists includes, for each image operation, steps of:

identifying a region affected by the image operation;

modifying image data associated with the identified region;

storing image data associated with each region in a form and at memory locations located within the allocated memory according to an amount of memory required to store the image data associated with all of the regions and an amount of memory allocated to store the image data associated with all of the regions;

updating the data structure; and recovering memory when the modifying causes the amount of memory required to store the image data associated with all of the regions to exceed the amount of memory allocated to store the image data associated with all of the regions.

32. The process of claim 31, wherein the recovering of memory comprises compressing uncompressed image data.

33. The process of claim 31, wherein the recovering of memory comprises decompressing and recompressing image data that has been compressed.

34. The process of claim 25, further comprising steps of:

reading stored image data for enough regions to provide enough image data for at least one scanline;

generating pixels from stored image data of a first region;

selecting a next region from regions read;

repeating the steps of generating and selecting until an end of a scanline is reached;

determining if a current region is a location in a next row, and returning to the step of reading when the current region is a location in the next row, and returning to the step of generating pixels when the current region is not a location in the next row.

35. The process of claim 25, wherein the step of rendering the display list comprises steps of:

accumulating into a display list, a sequence of at least one command in the page description;

terminating the step of accumulating according to a predetermined decision procedure;

processing the commands in the display list to produce and update an image in a frame buffer;

clearing the display list; and repeating the steps of accumulating, terminating, processing, and clearing until the page description has been completely processed.

36. A computer system for creating a computer readable representation of an image comprising:

means for creating a data structure for storing an indication of forms and memory locations of image data associated with regions of the image, where the image is defined as a plurality of said regions defined by a first number, M, indicating the number of rows of regions in the image and a second number, N, indicating the number of regions in each row of the image, such that M and N are both greater than one and each region comprises a plurality of line segments from a plurality of lines;

means for allocating memory to store image data associated with all of the regions;

means for rendering display lists including image operations; and means for storing image data independently for each of the associated regions in compressed or uncompressed form within the allocated memory, wherein the memory locations for the image data are determined independently of the compressed or uncompressed form of the image data.

37. The computer system of claim 36, wherein the display list comprises a subset of the image operations that represent the image and wherein the subset of image operations is processed sequentially in scan line order for each display list.

38. The computer system of claim 36, wherein the memory location of image data associated with a region is determined independently of the memory location of image data associated with other regions.

39. The computer system of claim 36, wherein the means for rendering comprises:
- means for identifying a region affected by the image operation;
- means for modifying image data associated with the identified region;
- means for storing image data associated with each region in a form and at memory locations located within the allocated memory according to an amount of memory required to store the image data associated with all of the regions and an amount of memory allocated to store the image data associated with all of the regions;
- means for updating the data structure;
- means for decompressing the image data associated with the identified region if the image data is compressed; and
- means for recovering memory when the amount of memory required to store the image data associated with all of the regions exceeds the amount of memory allocated to store the image data associated with all of the regions.

40. The computer system of claim 39, wherein the recovering of memory comprises compressing uncompressed image data.

41. The computer system of claim 39, wherein the recovering of memory comprises decompressing and recompressing image data that has been compressed.

42. The computer system of claim 36, wherein the means for rendering comprises:
- means for identifying a region affected by the image operation;
- means for modifying image data associated with the identified region;
- means for storing image data associated with each region in a form and at memory locations located within the allocated memory according to an amount of memory required to store the image data associated with all of the regions and an amount of memory allocated to store the image data associated with all of the regions;
- means for updating the data structure; and
- means for recovering memory when the means for modifying causes the amount of memory required to store the image data associated with all of the regions to exceed the amount of memory allocated to store the image data associated with all of the regions.

43. The computer system of claim 42, wherein the recovering of memory comprises compressing uncompressed image data.

44. The computer system of claim 42, wherein the recovering of memory comprises decompressing and recompressing image data that has been compressed.

45. A computer implemented process for creating a computer readable representation of an image comprising:
- creating a data structure for storing an indication of compressed or uncompressed form and memory locations of image data associated with regions of the image, where the image is defined as a plurality of said regions defined by a first number, M, indicating the number of rows of regions in the image and a second number, N, indicating the number of regions in each row of the image, such that M and N are both greater than one and each region comprises a plurality of line segments from a plurality of lines;
- allocating memory to store image data associated with all of the regions; and
- rendering display lists including image operations by performing, for each image operation, steps of:
  - identifying a region affected by the image operation;
  - modifying image data associated with the identified region;
  - storing image data associated with each region in a compressed or uncompressed form and at memory locations located within the allocated memory in accordance with space available in the allocated memory; and
  - updating the data structure.

46. A computer system for creating a computer readable representation of an image comprising:
- means for creating a data structure for storing an indication of compressed or uncompressed form and memory locations of image data associated with regions of the image, where the image is defined as a plurality of said regions defined by a first number, M, indicating the number of rows of regions in the image and a second number, N, indicating the number of regions in each row of the image, such that M and N are both greater than one and each region comprises a plurality of line segments from a plurality of lines;
- means for allocating memory to store image data associated with all of the regions; and
- means for rendering display lists including image operations, wherein the means for rendering comprises:
  - means for identifying a region affected by the image operation;
  - means for modifying image data associated with the identified region;
  - means for storing image data associated with each region in a compressed or uncompressed form and at memory locations located within the in accordance with space available in the allocated memory; and
  - means for updating the data structure.

* * * * *